(12) United States Patent
Yuan et al.

(10) Patent No.: US 9,048,967 B2
(45) Date of Patent: Jun. 2, 2015

(54) ASYMMETRIC OTN NETWORK TRAFFIC SUPPORT

(71) Applicant: Fujitsu Limited, Kanagawa (JP)

(72) Inventors: Catherine Yuan, Plano, TX (US); Vikas Mittal, Murphy, TX (US); David Solomon, River Vale, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 205 days.

(21) Appl. No.: 13/850,970

(22) Filed: Mar. 26, 2013

(65) Prior Publication Data

US 2013/0209087 A1  Aug. 15, 2013

Related U.S. Application Data

(63) Continuation-in-part of application No. 13/242,945, filed on Sep. 23, 2011, now Pat. No. 8,711,730.

(51) Int. Cl.
| | |
|---|---|
| *H04J 14/00* | (2006.01) |
| *H04J 3/14* | (2006.01) |
| *H04L 12/26* | (2006.01) |
| *H04L 1/24* | (2006.01) |
| *H04J 3/16* | (2006.01) |

(52) U.S. Cl.
CPC .......... *H04J 14/00* (2013.01); *H04J 2203/0069* (2013.01); *H04J 2203/0051* (2013.01); *H04J 2203/0071* (2013.01); *H04J 3/1652* (2013.01); *H04J 2203/0066* (2013.01); *H04J 2203/0089* (2013.01)

(58) Field of Classification Search
CPC .......... H04J 2203/0051; H04J 2203/0053; H04J 2203/0055; H04J 2203/0069; H04J 2203/0071; H04J 2203/0089; H04J 15/00; H04J 14/00; H04J 2203/0066; H04J 3/1652

See application file for complete search history.

(56) References Cited

U.S. PATENT DOCUMENTS

| | | | | |
|---|---|---|---|---|
| 8,249,451 | B2 * | 8/2012 | Lee et al. | 398/57 |
| 8,274,892 | B2 | 9/2012 | Chiang et al. | 370/235 |
| 8,553,702 | B2 * | 10/2013 | Genthner et al. | 370/395.21 |
| 8,693,480 | B2 * | 4/2014 | Dong et al. | 370/395.51 |
| 8,849,116 | B2 * | 9/2014 | Bellato et al. | 398/52 |
| 2008/0212961 | A1 | 9/2008 | Zhang | 398/25 |
| 2010/0061728 | A1 | 3/2010 | Virdee | 398/50 |

(Continued)

FOREIGN PATENT DOCUMENTS

EP         1 826 926         8/2007 ............ H04B 10/12

OTHER PUBLICATIONS

Notice of Allowance issued in U.S. Appl. No. 13/242,945, 9 pages, Dec. 16, 2013.

(Continued)

*Primary Examiner* — Ahmed Elallam
(74) *Attorney, Agent, or Firm* — Baker Botts L.L.P.

(57) ABSTRACT

A method of network communications includes determining an access identifier (AID) for an egress signal through a network interface of a network element, an Optical Transport Network (OTN) multiplexing structure identifier (MSI) associated with the egress signal through the network interface, another AID associated with a defined ingress signal through the network interface, another OTN MSI associated with the defined ingress signal through the network interface, and associating the egress signal and the defined ingress signal based on the AIDs and OTN MSIs. The first OTN MSI is not equal to the second OTN MSI.

18 Claims, 10 Drawing Sheets

(56) References Cited

U.S. PATENT DOCUMENTS

| | | |
|---|---|---|
| 2010/0183301 A1 | 7/2010 | Shin et al. ........................ 398/45 |
| 2011/0262128 A1* | 10/2011 | Madrahalli et al. ................ 398/2 |
| 2012/0106956 A1 | 5/2012 | Rao et al. ......................... 398/52 |
| 2012/0201535 A1 | 8/2012 | Loprieno et al. ................. 398/45 |
| 2012/0230674 A1 | 9/2012 | Yuan et al. ....................... 398/17 |
| 2012/0294610 A1 | 11/2012 | Genthner et al. ............... 398/45 |
| 2012/0302185 A1* | 11/2012 | Hotta et al. ................... 455/119 |
| 2013/0209087 A1 | 8/2013 | Yuan et al. ........................ 398/9 |
| 2013/0315592 A1* | 11/2013 | Sharma et al. .................. 398/58 |

OTHER PUBLICATIONS

Non-Final Office Action issued in U.S. Appl. No. 13/242,945, 8 pages, Aug. 27, 2013.
Extended European Search Report issued in European Patent Application No. 12185190.1-1851; 6 pages, Feb. 24, 2015.

* cited by examiner

US 9,048,967 B2

ASYMMETRIC OTN NETWORK TRAFFIC SUPPORT

RELATED APPLICATION

This application is a continuation-in-part of U.S. patent application Ser. No. 13/242,945 filed Sep. 23, 2011, the contents of which is hereby incorporated by reference in its entirety.

TECHNICAL FIELD OF THE INVENTION

The present invention relates generally to networking and computing systems and, more particularly, to asymmetric Optical Transport Network (OTN) traffic support.

BACKGROUND

Telecommunications systems, cable televisions systems, and data communication networks use communication networks to rapidly convey large amounts of information between remote points. A communication network may include network elements that route packets through the network. Some network elements may include a distributed architecture, wherein packet processing may be distributed among several subsystems of the network element (e.g., line cards).

For many years, the management of communications networks using synchronous optical networking (SONET) and synchronous digital hierarchy (SDH) multiplexing equipment has been primarily based on Transaction Language 1 (TL1) which uses a fixed Access Identifier (AID) representing a containment relationship (e.g., where "A>B" is read as "A contains B"). Some example SONET containment relationships may include:

OC-N>STS-1>VT (where VT=VT1.5, VT2, VT3, VT6)
OC-N>STS-Nc (where c=3, 12, or 48) (referred to as "concatenated" Synchronous Transport Signals (STS))

In the case of concatenation, STS-Nc signals must begin on boundaries of 3, 12, or 48 in the concatenated frame OC-N. That is, in the case of SONET/SDH, by knowing a signal type (e.g., STS-1, VT2, STS-3c) and the TL1 AID structure (e.g., 1-3-2-6=Shelf 1, Slot 3, Port 2, STS-1 channel #3), one can unambiguously identify the target signal in the SONET/SDH frame structure.

Communications networks are now often configured as an Optical Transport Network (OTN) as defined by ITU Telecommunication Standardization Sector (ITU-T) Recommendation G.709. With OTN, relevant networking standards provide significantly flexible containment relationships for data frames, as compared with prior technologies.

SUMMARY

In accordance with the present invention, disadvantages and problems associated with identifying a target signal in an optical transport network frame structure may be reduced or eliminated.

In accordance with embodiments of the present disclosure, a method of network communications includes determining an access identifier (AID) for an egress signal through a network interface of a network element, an Optical Transport Network (OTN) multiplexing structure identifier (MSI) associated with the egress signal through the network interface, another AID associated with a defined ingress signal through the network interface, another OTN MSI associated with the defined ingress signal through the network interface, and associating the egress signal and the defined ingress signal based on the AIDs and OTN MSIs. The first OTN MSI is not equal to the second OTN MSI.

In accordance with other embodiments of the present disclosure, a network element includes a network interface, a memory, and a processor communicatively coupled to the memory. The memory includes an entry including an AID associated with an egress signal through the network interface and an OTN MSI associated with the egress signal through the network interface. The memory includes another entry in the memory including an AID associated with a defined ingress signal through the network interface and an OTN MSI associated with the defined ingress signal through the network interface. The OTN MSIs are not equal. The processor is configured to associate the entries based on the AIDs and the OTN MSIs.

One or more other technical advantages of the present disclosure may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Embodiments of the present invention and its advantages are best understood by referring to FIGS. 1-8, like numerals being used for like and corresponding parts of the various drawings.

Figure 1:
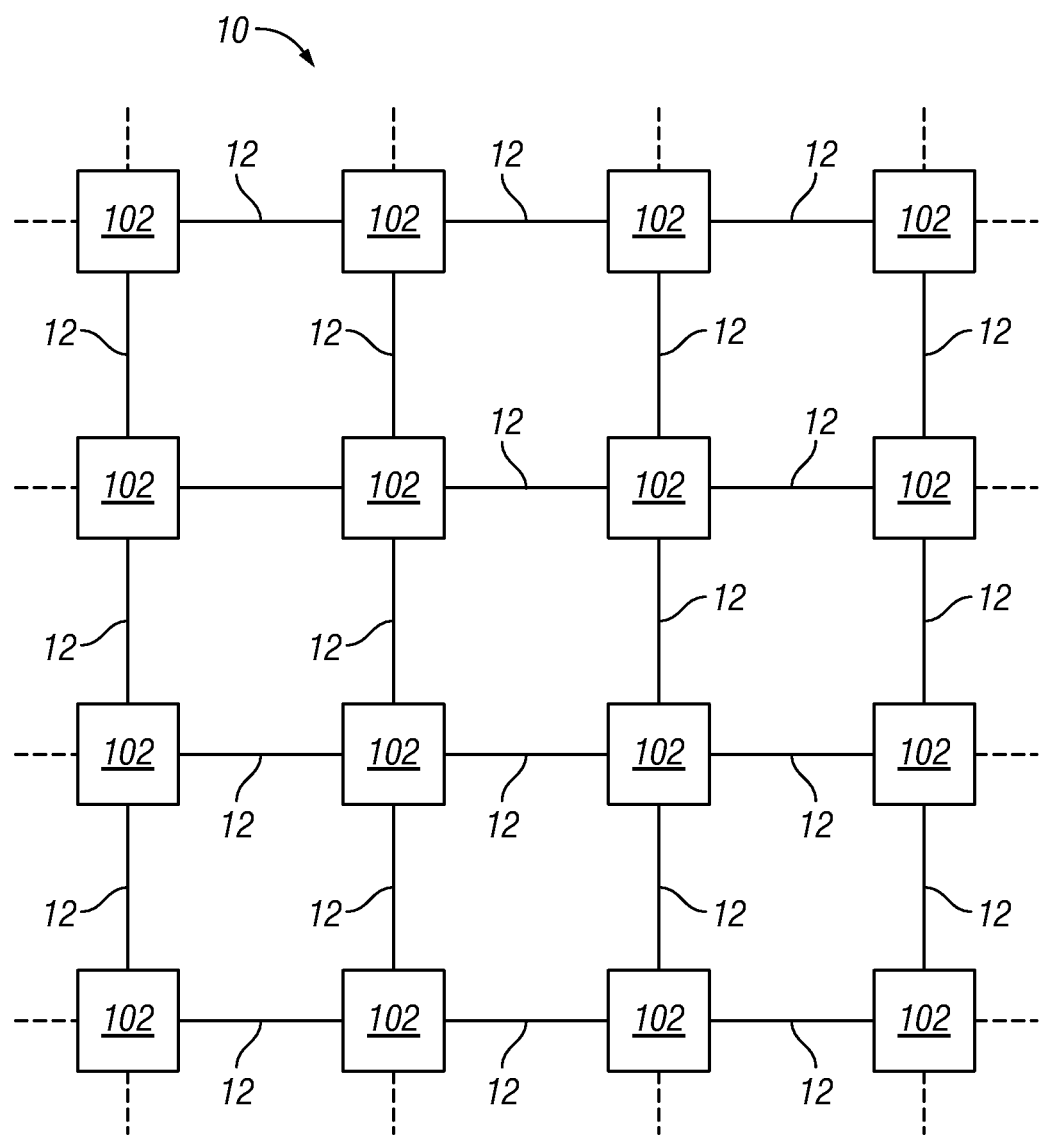
FIG. 1 illustrates a block diagram of an example network, in accordance with embodiments of the present disclosure.

FIG. 1 illustrates a block diagram of an example network 10, in accordance with certain embodiments of the present disclosure. In certain embodiments, network 10 may be an Ethernet network. In these and other embodiments, network 10 may be an optical network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes to create a mesh. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks. Network 10 may represent all or a portion of a short-haul metropolitan network, a long-haul inter-city network, and/or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, copper cable, SONET cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream. As used herein, the term "datagram" will be used to generally refer to any data structure used to convey traffic, including without limitation a packet, a frame, an unstructured bit stream, or any other suitable data structure.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

Figure 2:
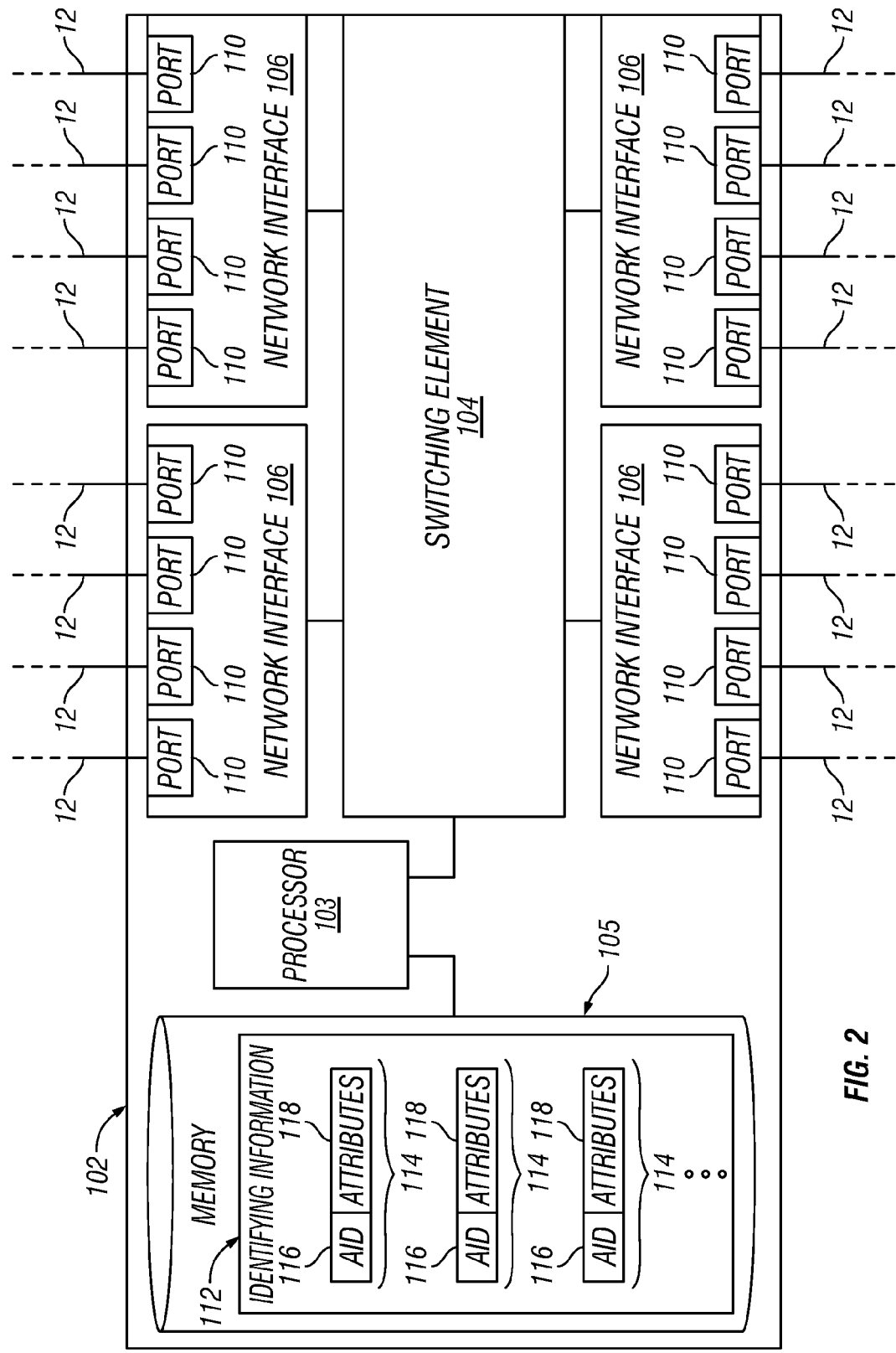
FIG. 2 illustrates a block diagram of an example network element, in accordance with embodiments of the present disclosure.

FIG. 2 illustrates a block diagram of an example network element 102, in accordance with certain embodiments of the present disclosure. As discussed above, each network element 102 may be coupled to one or more other network elements 102 via one or more transmission media 12. In some embodiments, however, not all network elements 102 may be directly coupled as shown in FIG. 2. Each network element 102 may generally be configured to receive data from and/or transmit data to one or more other network elements 102. In certain embodiments, network element 102 may comprise a switch or router configured to transmit data received by network element 102 to another device (e.g., another network element 102) coupled to network element 102.

As depicted in FIG. 2, network element 102 may include a processor 103, a memory 105, a switching element 104, and one or more network interfaces 106 communicatively coupled to switching element 104.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 105 and/or another component of network element 102. Although FIG. 2 depicts processor 103 as independent of other components of network element 102, in some embodiments one or more processors 103 may reside on network interfaces 106 and/or other components of network elements 102. In operation, processor 103 may process and/or interpret traffic received at a port 110. Accordingly, processor 103 may receive traffic from, or transmit traffic to ports 110 and network elements 106 via switching element 104.

Memory 105 may be communicatively coupled to processor 103 and may include any system, device, or apparatus configured to retain program instructions and/or data for a period of time (e.g., computer-readable media). Memory 105 may include random access memory (RAM), electrically erasable programmable read-only memory (EEPROM), a PCMCIA card, flash memory, magnetic storage, opto-magnetic storage, or any suitable selection and/or array of volatile or non-volatile memory that may retain data after power to network element 102 is turned off. Although FIG. 2 depicts memory 105 as independent of other components of network element 102, in some embodiments one or more memories 105 may reside on network interfaces 106 and/or other components of network element 102.

As shown in FIG. 2, memory 105 may have stored thereon identifying information 112 for various signals that may be communicated within traffic datagrams (e.g., OTN frames). Identifying information 112 may include one or more entries 114, each entry 114 corresponding to a signal in an OTN frame. Each entry may include an AID 116 for the signal and attributes 118 for the signal. AID 116 may include at least a four-part identifier in the form of <shelf>-<slot>-<port>-<channel>, as known in the art.

In one embodiment, AID 116 may include a prefix for the <port> number. Such a prefix may include a facility rate label and be denoted as <Facility Rate Label>. Thus, an AID 116 may be presented in the form of <shelf>-<slot>-<port>-<Facility Rate Label><channel>. A facility rate label may correspond to the following values:
  "A": ODU-1|OTU-1
  "B": ODU-2|OTU-2
  "C": ODU-3|OTU-3
  "D": ODU-4|OTU-4
  "E": ODU2E
  "X": ODUflex
  "Z": ODU0

Attributes 118 may include one or more attributes that, when combined with an AID 116, identifies an OTN mapping for a target OTN signal. Attributes 118 associated with an AID 116 in an entry 114 may include one or more of the following:
  OTN multiplexing structure to multiplex the target lower order signal (e.g., ODU-2, ODU-1, ODU-flex, ODU-2e, etc.) into the higher order optical data unit (ODU) structure (e.g., ODU4, ODU3, etc.)
  Higher Order Optical Data Unit (HO-ODU): with respect to the signal, the higher order optical data unit entity for the supporting entity of the lower order optical data unit (LO-ODU).
  Higher Order Optical Data Unit Tributary Slots (HO-ODUTS): the tributary slots selection to map the lower order optical data unit into the higher order or intermediate higher order optical data unit entity's multiplexing structure identifier (MSI).

Higher Order Optical Data Unit Tributary Port (HO-ODUTP): the tributary port number in the higher order or intermediate higher order optical data unit entity's MSI structure. In a single-stage OTN multiplex, HO-ODUTP may be fixed to or based on the channel in the target signal AID (and user may not need to specify HO-ODUTP); in a multiple-stage OTN multiplex, HO-ODUTP may be manually specified by a user or Network Management System (NMS)

TXMSI: The transmit MSI (Optical Channel Payload Unit (OPUk) Multiplex Structure Identifier)

EXPMSI: The expected incoming MSI

RXMSI: The actual received MSI

RATE_RX: The ingress rate

RATE_TX: The egress rate

By combining such attributes 118 with an AID 116, a user may be able to fully reconstruct an OTN multiplex structure for a signal.

Returning to FIG. 2 switching element 104 may include any suitable system, apparatus, or device configured to receive traffic via a port 110 and forward such traffic to a particular network interface 106 and/or port 110 based on analyzing the contents of the datagrams carrying the traffic and/or based on a characteristic of a signal carrying the datagrams (e.g., a wavelength and/or modulation of the signal). For example, in certain embodiments, a switching element 104 may include a switch fabric (SWF).

Each network interface 106 may be communicatively coupled to switching element 104 and may include any suitable system, apparatus, or device configured to serve as an interface between a network element 102 and a transmission medium 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card.

As depicted in FIG. 2, each of network interfaces 106 may include one or more physical ports 110. Each physical port 110 may include any system, device or apparatus configured to serve as a physical interface between a corresponding transmission medium 12 and network interface 106. For example, a physical port 110 may comprise an Ethernet port, an optical port, or any other suitable port.

A component of network 10 and/or a network element 102 may include an interface, logic, memory, and/or other suitable element. An interface receives input, sends output, processes the input and/or output, and/or performs other suitable operations. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

The operations and configurations of network element 102, as described herein, may be performed fully or in part by one or more of network interfaces 106.

For a given one or more of ports 110, network element 102 may be configured to provide provisioning for asymmetrical egress and ingress communication. In one embodiment, asymmetrical egress and ingress communication may be defined herein through at least two types of asymmetrical communication. One such type may include, as referred to herein, a "Type I" asymmetrical communication. Type I asymmetrical communication may include communication in which the total communication rate of egress for a given port 110 or network interface 106 is different than the total communication rate of expected or defined ingress for the given port 110 or network interface. Such ingress may be considered as "expected" or "defined" as such because the actual ingress signal may mismatch what has been expected or defined as to be received for the given port 110. The expected ingress signal may be defined according to partitioning and provisioning for the signal as described below. Such differences may manifest themselves in, for example, different ODUs. For example, egress may include HO-ODU2, unidirectionally transmitted while expected ingress may include HO-ODU3, unidirectionally received. Another such type may include, as referred to herein, a "Type II" asymmetrical communication. Type II asymmetrical communication may include communication in which the total communication rate of egress for a given port 110 or network interface 106 is the same as the total communication rate of expected ingress for the given port 110 or network interface, but herein such communication rates comprise different communication patterns. Such differences may manifest themselves in, for example, different LO-ODUs. For example, egress may include HO-ODU2, unidirectionally or bidirectionally transmitted and expected ingress may include HO-ODU2, unidirectionally or bidirectionally received. However, the specific LO-ODU components making up each HO-ODU2 may be different.

Network element 102 may be configured to determine, for a given port 110 or network interface 106, the TXMSI and EXPMSI. In one embodiment, such a determination may be made by deriving each of the TXMSI and EXPMSI independently from one another. The derivation may be made according to the individual LO-ODU components specified by, for example, an administrator, control command, received data, or other instructions received at network element 102. The independent derivation of the TXMSI and EXPMSI may be made from the provisioned LO-ODU for egress and ingress, respectively.

Figure 3A:
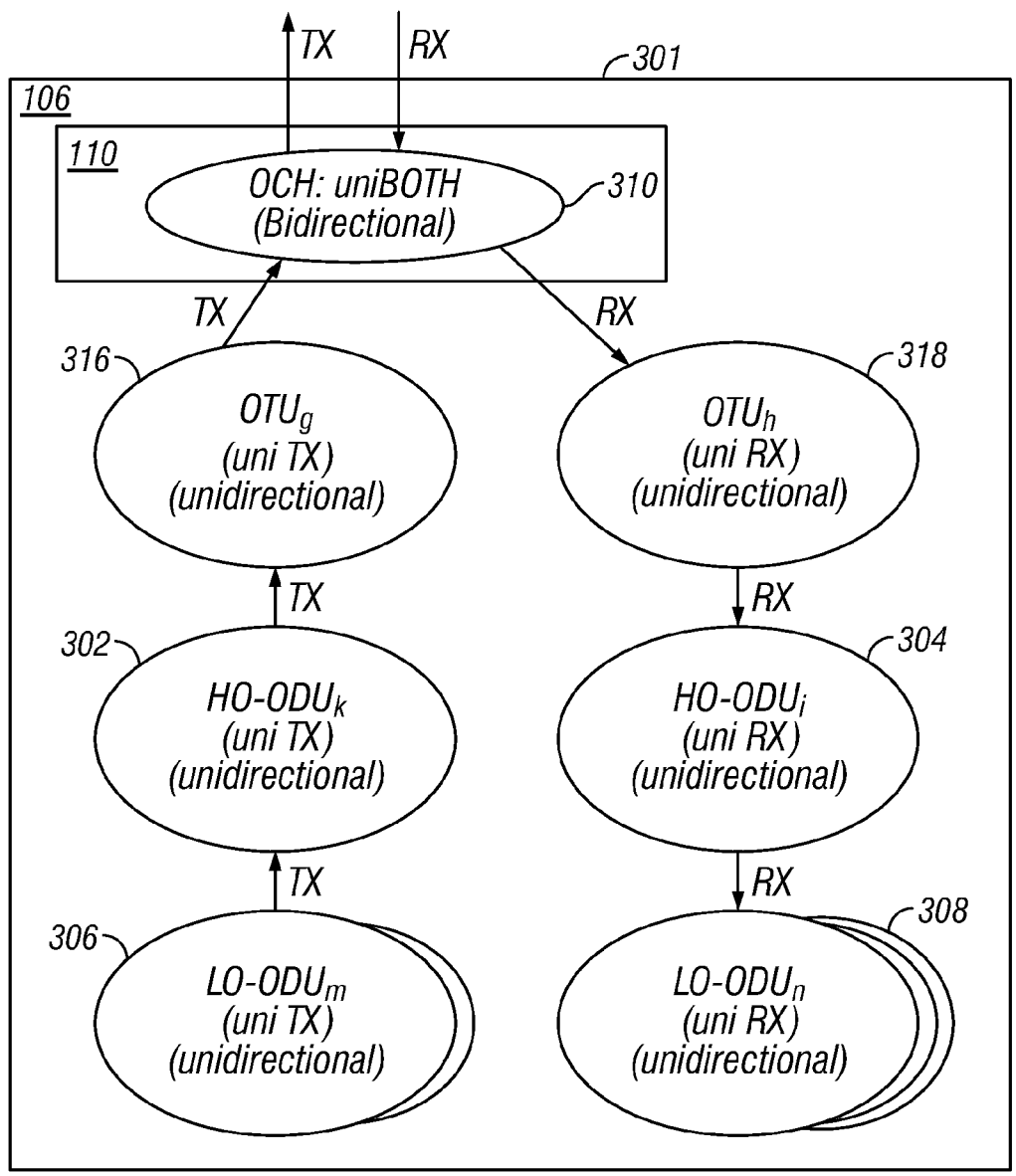
FIGS. 3A, 3B, and 3C illustrate data models for network provisioning.
Figure 3B:
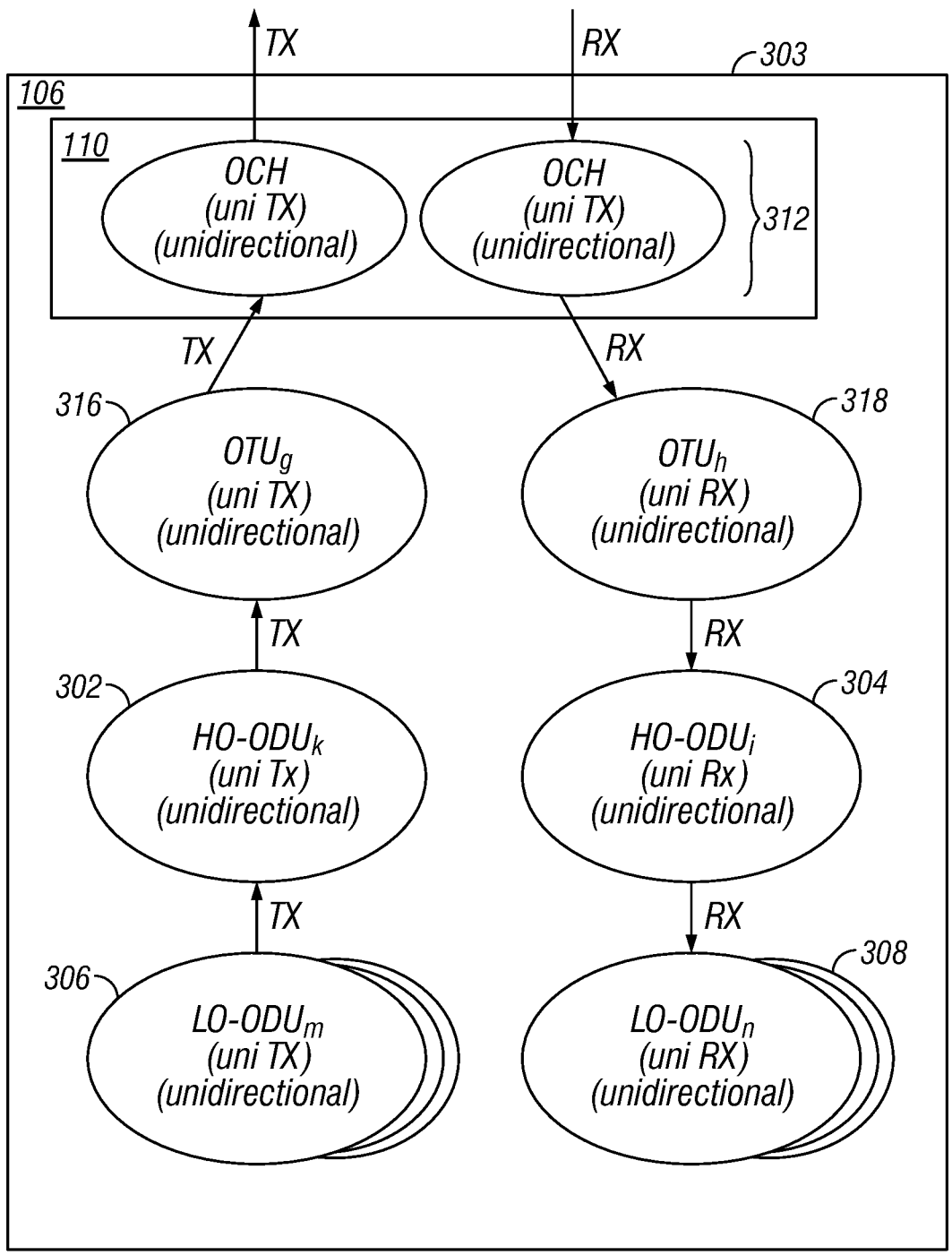
Figure 3C:
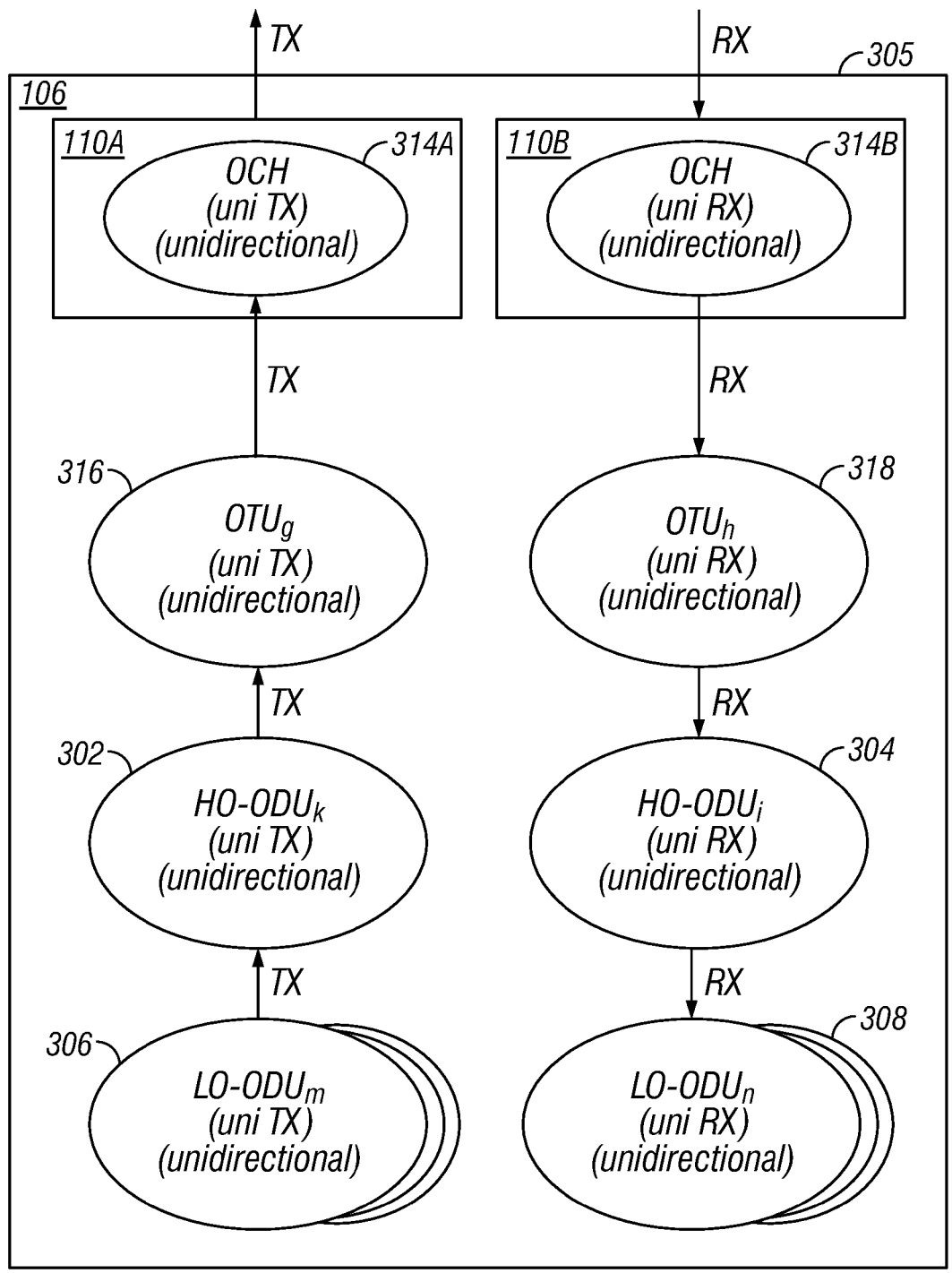

In order to support different LO-ODU patterns in the transmission and reception direction (which may result in different total transmission and reception rates in Type I asymmetry or in the same total transmission and reception rates in Type II asymmetry), data models as illustrated in FIGS. 3A, 3B, and 3C may be used. In traditional SONET OC-N networks, transmission and reception provisioning is made using the same pattern of STSs or VTs. However, the data models as illustrated in FIGS. 3A, 3B, and 3C may use a middleware adaptation. Any one of the data models as illustrated in FIG. 3A, 3B, or 3C may be used by network element 102 to provision asymmetrical communication for a given port 110 or network interface 106.

FIG. 3A illustrates a data model 301 for provisioning an optical channel (OCH) 310 of port 110 of network interface 106. OCHs may be used as a specification of the input or output optical channels for a given network interface 106. OCH 310 may include a bidirectional specification. The bidirectional specification may be built upon the optical transport unit (OTU) 316 for transmission and upon the OTU 318 for expected reception. OTU 316 may be defined with an order g corresponding to an integer value such that the definition of the OTU may be OTU-g. Furthermore, OTU 318 may be defined with an order h corresponding to an integer value such that the definition of the OTU may be OTU-h. In Type I asymmetry, the order of OTU-g 316 may be different than the order of OTU-h 318. In other words, g and h may be different. In Type II asymmetry, the order of OTU-g 316 may be the same as the order of OTU-h 318. In other words, g and h may be equal.

OTU-g 316 and OTU-h 318 may each be built upon respective sets of ODUs, such as HO-ODUk 302 for transmission and HO-ODUi 304 for expected reception. Each may be associated with a respective degree k and i. In Type I asymmetry, the order of HO-ODUk 302 may be different than the order of HO-ODUi 304. In other words, k and i may be different. In Type II asymmetry, the order of HO-ODUk 302 may be the same as the order of HO-ODUi 304. In other words, k and i may be equal.

HO-ODUk 302 and HO-ODUi 304 may each be built upon respective sets of individual LO-ODUs, such as LO-ODUs 306 for transmission and LO-ODUs 308 for expected reception. LO-ODUs 306 may be defined by a set m of ODUs that have been defined for transmission. Furthermore, LO-ODUs 308 may be defined by a set n of ODUs that have been defined for expected reception. The set of LO-ODUs 306 for transmission may be different than the set of LO-ODUs 308 for expected reception. Set m and set n may each include any number or kind of ODUs. Furthermore, the respective sets m and n may differ in both number and kind from each other.

FIG. 3B illustrates a data model 303 for provisioning an OCH 312 of port 110 of network interface 106. OCH 312 may include two components, a unidirectional transmission specification and a unidirectional reception specification. Each respective unidirectional transmission specification may be built upon OTU-g-316 and OTU-h 318, which may in turn be built upon HO-ODUk 306 and HO-ODUi 304, respectively. HO-ODUk 306 may be built upon the sum of individual LO-ODUs 306, defined by a set m of ODUs while HO-ODUi 304 may be built upon the sum of individual LO-ODUs 308, defined by a set n of ODUs that have been defined for expected reception.

In Type I asymmetry, the order of HO-ODUk 302 may be different than the order of HO-ODUi 304. In other words, k and i may be different. The order of OTU-g 316 may be different than the order of OTU-h 318. In other words, g and h may be different. In Type II asymmetry, the order of HO-ODUk 302 may be the same as the order of HO-ODUi 304. In other words, k and i may be equal. The order of OTU-g 316 may the same as the order of OTU-h 318. In other words, g and h may be equal.

FIG. 3C illustrates a data model 305 for provisioning an OCH 314 of ports 110A and 100B of network interface 106. OCH 312 may include two components, a unidirectional transmission specification 314A and a unidirectional reception specification 314B. Unidirectional transmission specification 314A may be built upon OTU-g 316, which may in turn be built upon HO-ODUk 306. HO-ODUk 306 may be built upon the sum of individual LO-ODUs 306, defined by a set m of ODUs. Unidirectional reception specification 314B may be built upon OTU-h 318, which may in turn be built upon HO-ODUi 304. HO-ODUi 304 may be built upon the sum of individual LO-ODUs 308, defined by a set n of ODUs that have been defined for expected reception.

In Type I asymmetry, the order of HO-ODUk 302 may be different than the order of HO-ODUi 304. In other words, k and i may be different. The order of OTU-g 316 may be different than the order of OTU-h 318. In other words, g and h may be different. In Type II asymmetry, the order of HO-ODUk 302 may be the same as the order of HO-ODUi 304. In other words, k and i may be equal. The order of OTU-g 316 may the same as the order of OTU-h 318. In other words, g and h may be equal.

Provisioning of OCHs 310, 312, 314 may be made through generation of a command sequence. Such generation may be performed automatically given, for example, specification of LO-ODUs 306 and LO-ODUs 308. LO-ODUs 306 and LO-ODUs 308 may be specified by, for example, input by a user, administrator, or other controller of network element 102. The selection of a choice between the available data models by which the OCH will be generated may be made according to design choice. Use of data model 301 may result in a command sequence for provisioning OCH 310 in a single port. Such a command sequence may include bidirectional specifications. Furthermore, data model 303 may result in a command sequence for provisioning OCH 312 in a single port. Such a command sequence may include unidirectional specifications. In addition, data model 305 may result in a command sequence for provisioning OCH 314 across two ports. Such a command sequence may include unidirectional specifications for each port.

Figure 4:
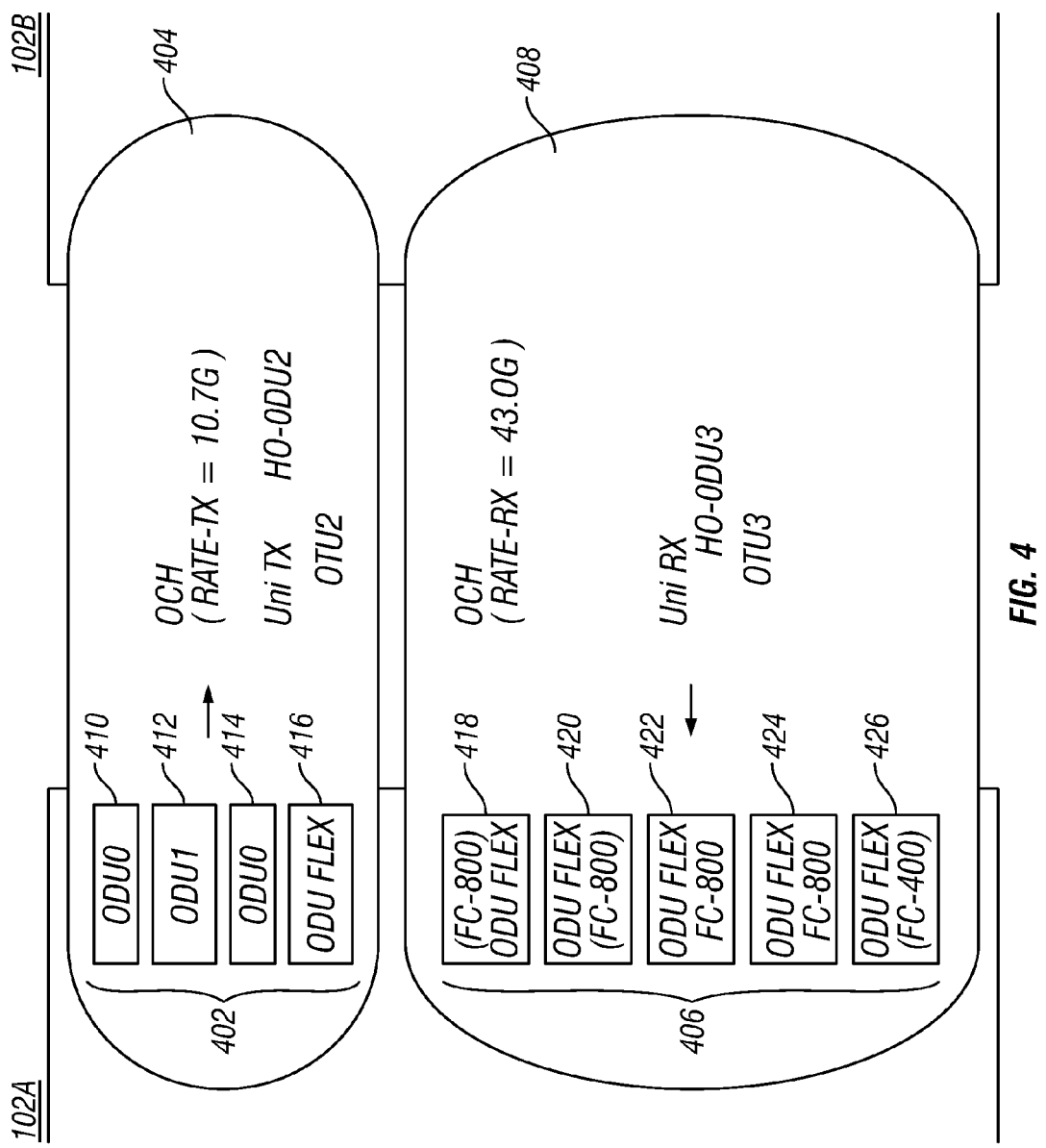
FIG. 4 illustrates a user-specified optical data unit (ODU) sequence for egress and ingress to a network element wherein the total egress rate is different than the total ingress rate.

FIG. 4 illustrates a user-specified ODU sequence for egress and ingress to network element 102A wherein the total egress rate is different than the total ingress rate. Such a sequence may represent, for example, Type I asymmetry. Communication may be made with network entity 102B.

Expected ingress ODUs 406 may be specified by a user of network element 102 and, in the example of FIG. 4, may include, in order, an ODUflex channel 418 (for example, of type FC-800), another ODUflex channel 420 (for example, of type FC-800), another ODUflex channel 422 (for example, of type FC-800), another ODUflex channel 424 (for example, of type FC-800), and another 426 ODUflex channel (for example, of type FC-400). ODUs 406 may correspond to LO-ODUs 308 of the data models illustrated in FIGS. 3A, 3B, and 3C.

The resulting total capacity of expected ingress ODUs 406 may collectively equal (or be less than) the resulting total capacity of expected ingress HO-ODU 408. Network element 102A may be configured to determine HO-ODU 408 from expected ingress ODUs 406. HO-ODU 408 may correspond to HO-ODUi 304 of the data models illustrated in FIGS. 3A, 3B, and 3C. HO-ODU 408 may include a HO-ODU3 and have a transfer rate of 43.0 Gigabits/second.

Egress ODUs 402 may be specified by a user of network element 102 and, in the example of FIG. 4, may include, in order, an ODU0 channel 410, an ODU1 channel 412, an ODU0 channel 414, and an ODUflex channel 416. ODUs 402 may correspond to LO-ODUs 306 of the data models illustrated in FIGS. 3A, 3B, and 3C.

The resulting total capacity of egress ODUs 402 may collectively equal (or be less than) the resulting total capacity of egress HO-ODU 404. Network element 102A may be configured to determine HO-ODU 404 from egress ODUs 402. HO-ODU 404 may correspond to HO-ODUk 302 of the data models illustrated in FIGS. 3A, 3B, and 3C. HO-ODU 404 may include a HO-ODU2 and have a transfer rate of 10.7 Gigabits/second.

Figure 5:
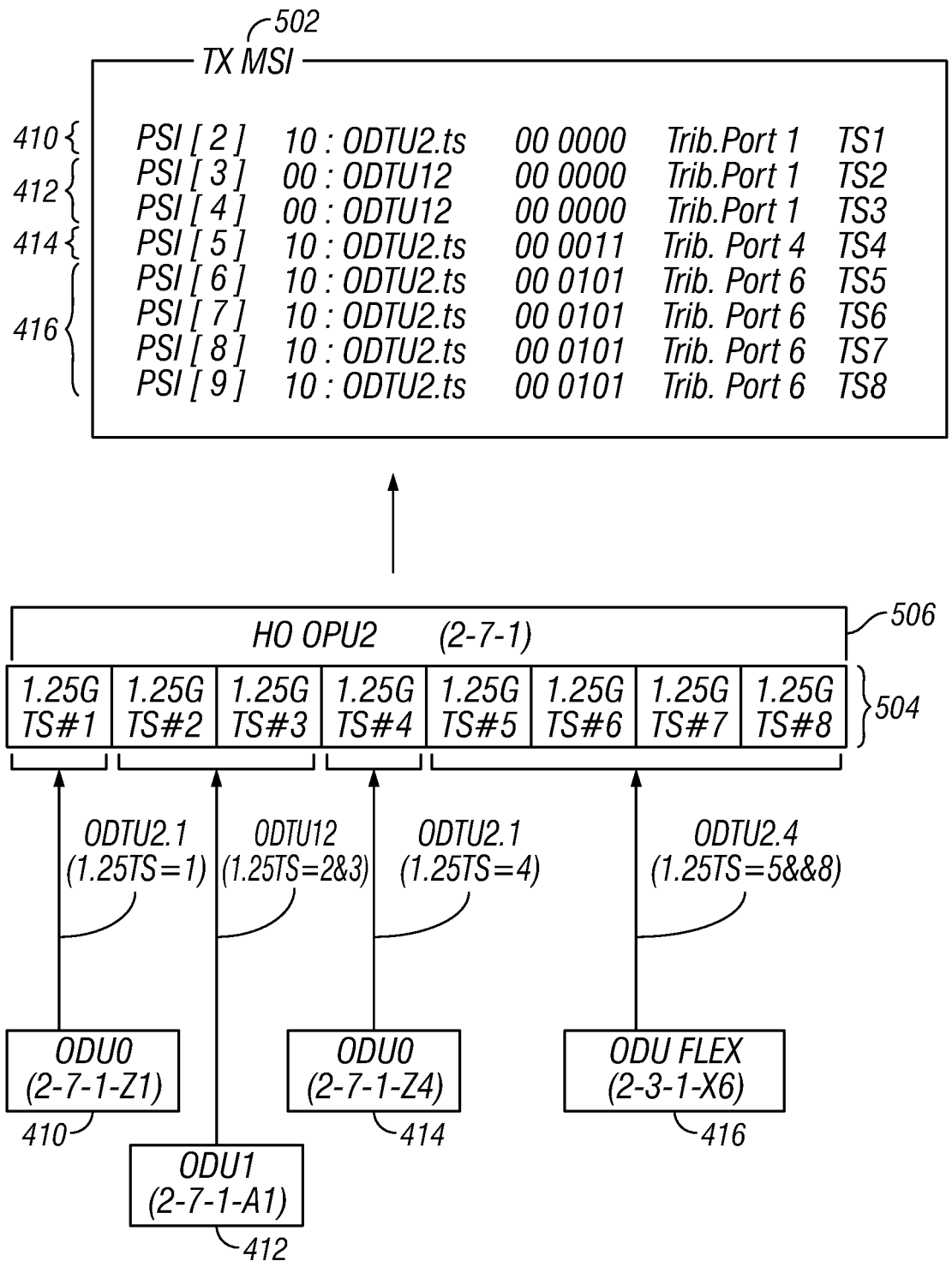
FIG. 5 illustrates a more detailed view of a user-specified ODU sequence for egress to a network element.

FIG. 5 illustrates a more detailed view of user-specified ODU sequence for egress to network element 102A. The egress may result in a HO-ODU2 as provisioned in FIG. 4. Network element 102 may be configured to analyze provisioning of ODUs 410, 412, 414, 416 and generate a resulting TXMSI 502 for the HO-ODU2.

Each of ODUs 410, 412, 414, 416 may be input into one or more time slots 504 as appropriate to the bandwidth of the individual ODU. Such time slots 504 may then form a resultant payload such as HO-OPU2. Network element 102 may include an OCH designated as (2-7-1). TXMSI 502 may be organized according to payload structure identifiers (PSI) which may index the entries of the component signals of the HO-ODU2. Each such entry may include optical data unit transport type, AID fields, indications of tributary ports, and corresponding time slices. A given one of ODUs 410, 412, 414, 416 may correspond to a range of entries in TXMSI 502.

Figure 6:
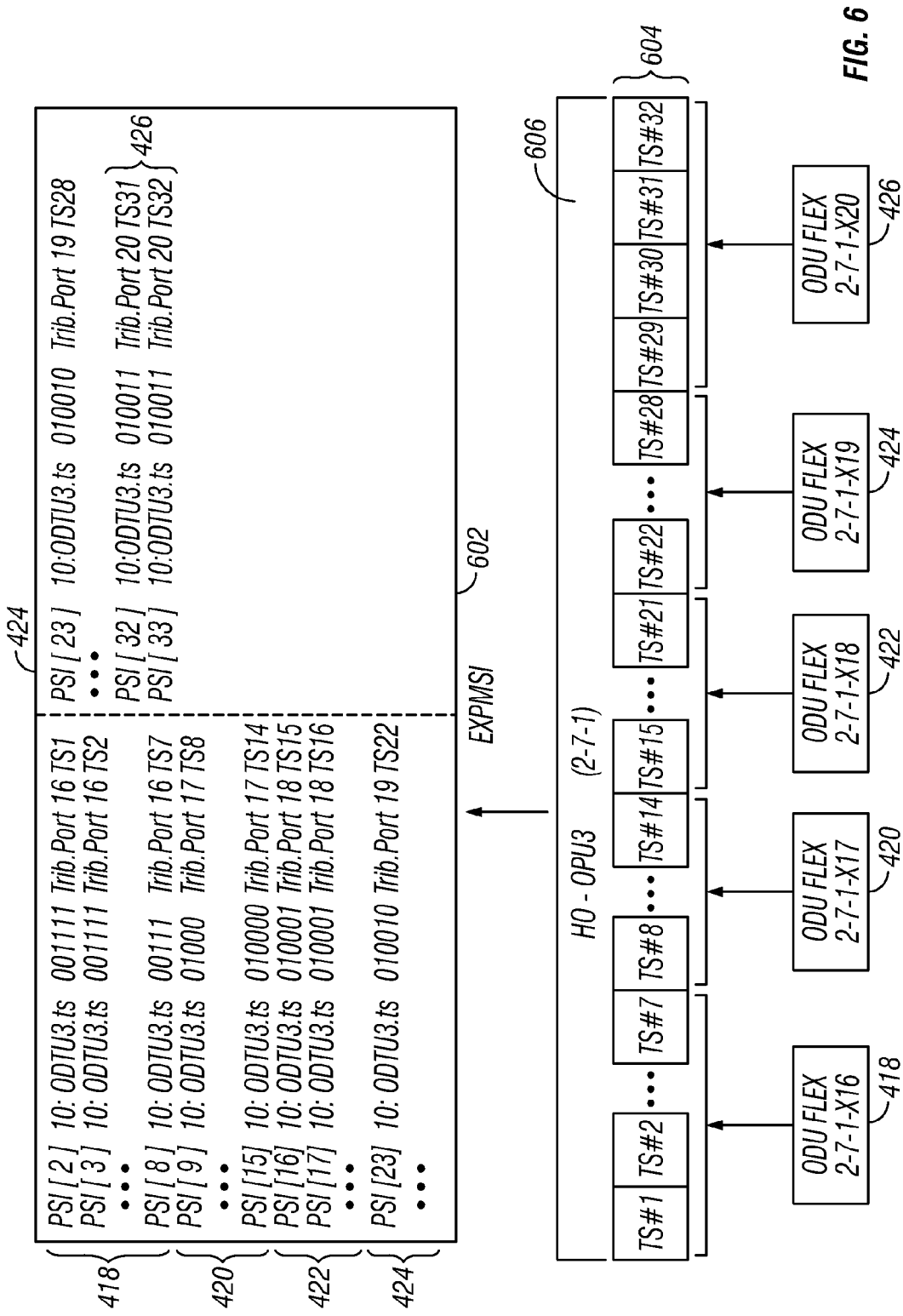
FIG. 6 illustrates a more detailed view of a user-specified ODU sequence for expected ingress to a network element.

FIG. 6 illustrates a more detailed view of user-specified ODU sequence for expected ingress to network element 102A. The egress may result in a HO-ODU3. Network element 102 may be configured to analyze provisioning of ODUs 418, 420, 422, 424, 426 and generate a resulting EXPMSI 502 for the HO-ODU3.

Each of ODUs 418, 420, 422, 424, 426 may be input into one or more time slots 604 as appropriate to the bandwidth of the individual ODU. Such time slots 604 may then form a resultant payload such as HO-OPU3. Network element 102 may include an OCH designated as (2-7-1). EXPMSI 602 may be organized according to payload structure identifiers (PSI) which may index the entries of the component signals of the HO-ODU2. Each such entry may include optical data unit transport type, AID fields, indications of tributary ports, and corresponding time slices. A given one of ODUs 418, 420, 422, 424, 426 may correspond to a range of entries in EXPMSI 602.

To generate EXPMSI 602 and TXMSI 502, network element 102 may first determine which data model, such as data models 301, 303, 305, is to be used. In one embodiment, given a decision to use the same ingress and egress port, network element 102 may create a single OCH with different transmission and receiving rates, according to data model 301. Network element 102 may automatically generate commands to create the appropriate transport units and ODUs for EXPMSI 602 and TXMSI 502 to correspond to the different ingress and egress direction.

Commands to create the OCH may include, for example, "ENT-OCH::2-7-1:CTAG:::RATE-TX=10.7, RATE-RX=43.0,DIRN=UNIBOTH". The command portion "ENT-OCH::2-7-1" may specify the creation of an OCH with the designation "2-7-1". "CTAG" may establish a rate of transfer according to a template of <total transmission rate>, <total receiving rate>, <directional indicators>. In the present example, the commands may establish that the OCH is unidirectional with transmission rate of 10.7 Gigabits per second and a receiving rate of 43.0 Gigabits per second. Creation of the OCH may spawn automatic generation of the ODUs, such as HO-ODU2 404 and HO-ODU3 408 for transmitting and receiving, respectively.

In another embodiment, given a decision to use the same ingress and egress port, network element 102 may create an OCH for each of the different transmission and receiving rates, according to data model 303. Each OCH may include a facility label for the corresponding direction. Network element 102 may automatically generate commands to create the appropriate transport units and ODUs for EXPMSI 602 and TXMSI 502 to correspond to the different ingress and egress directions.

Commands to create the OCHs may include, for example, "ENT-OCH::2-7-B1:CTAG:::RATE-TX=10.7, DIRN=UNITX" as well as "ENT-OCH::2-7-C1:CTAG:::RATE-RX=43.0, DIRN=UNIRX". The command portions "ENT-OCH::2-7-B1" and "ENT-OCH::2-7-C1" may specify the creation of OCHs with facility labels according to the rates involved with each OCH. "CTAG" may establish a rate of transfer according to a template of <total rate>, <directional indicators>. In the present example, the commands may establish that an OCH is created for unidirectional transmitting 10.7 Gigabits per second, and that an OCH is created for unidirectional receiving 43.0 Gigabits per second. Creation of the OCHs may spawn automatic generation of the ODUs, such as HO-ODU2 404 and HO-ODU3 408 for transmitting and receiving, respectively.

In yet another embodiment, given a decision to use different ingress and egress ports, network element 102 may create an OCH for each of the different transmission and receiving rates, according to data model 305. Network element 102 may automatically generate commands to create the appropriate transport units and ODUs for EXPMSI 602 and TXMSI 502 to correspond to the different ingress and egress directions for the respective ports.

Commands to create the OCHs may include, for example, "ENT-OCH::2-7-1:CTAG:::RATE-TX=10.7, DIRN=UNITX" as well as "ENT-OCH::2-7-2:CTAG:::RATE-RX=43.0, DIRN=UNIRX". The command portions "ENT-OCH::2-7-1" and "ENT-OCH::2-7-2" may each specify the creation of an OCH on different ports according to the rates involved with each OCH. Named keywords may establish a rate of transfer according to a template of <total rate>, <directional indicators>. In the present example, the commands may establish that an OCH is created for unidirectional transmitting 10.7 Gigabits per second, and that an OCH is created for unidirectional receiving 43.0 Gigabits per second. Creation of the OCH may spawn automatic generation of the ODUs, such as HO-ODU2 404 and HO-ODU3 408 for transmitting and receiving, respectively.

Furthermore, commands may be auto-generated for the LO-ODUs that form the respective transmitting and receiving ODUs.

For example, for HO-ODU2 404, commands may be auto-generated for establishing ODUs 410, 412, 414, 416. Such commands may include, for example:

ENT-ODU0::2-7-1-Z1:CTAG:::TS=1,DIRN=UNITX;
    ENT-ODU0::2-7-1-Z4:CTAG:::TS=4,DIRN=UNITX;
    ENT-ODU1::2-7-1-A1:CTAG:::TS=2&3,DIRN=UNITX;
    ENT-ODUFLEX::2-7-1-X6:CTAG:::ClientSvc=4FC, TS=5&&8,DIRN=UNITX;

Each such command may create an ODU of the specified type in TXMSI 502 for the port (2-7-1), unidirectionally in the transmit mode, and with associated time slot assignments. A subsequent query of HO-ODU2 404 should yield TXMSI 502 illustrating the ODU allotments as established by the commands illustrated above. An MSI query of HO-ODU2 404 should not yield another MSI structure corresponding to, for example, actual or expected received MSI.

Similarly, for HO-ODU3 408, commands may be auto-generated for establishing ODUs 418, 420, 422, 424, 426. Such commands may include, for example:

ENT-ODUFLEX::2-7-1-X16:CTAG::: ClientSvc=8FC, TS=1&&7, DIRN=UNIRX; ## Allocate 7 TS for FC-800

ENT-ODUFLEX::2-7-1-X17:CTAG::: ClientSvc=8FC, TS=8&&14, DIRN=UNIRX; ## Allocate 7 TS for FC-800

ENT-ODUFLEX::2-7-1-X18:CTAG::: ClientSvc=8FC, TS=15&&21, DIRN=UNIRX; ## Allocate 7 TS for FC-800

ENT-ODUFLEX::2-7-1-X19:CTAG::: ClientSvc=8FC, TS=22&&28, DIRN=UNIRX; ## Allocate 7 TS for FC-800

ENT-ODUFLEX::2-7-1-X20:CTAG::: ClientSvc=4FC, TS=29&&32, DIRN=UNIRX; ## Allocate 4 TS for FC-400

Each such command may create an ODU of the specified type in EXPMSI 602 for the port (2-7-1) (alternatively, (2-7-2) wherein two ports are used), unidirectionally in the receive mode, and with associated time slot assignments. A subsequent query of HO-ODU3 408 should yield EXPMSI 602 illustrating the ODU allotments as established by the commands illustrated above. An MSI query of HO-ODU3 408 should not yield another MSI structure corresponding to, for example, transmitted MSI.

Figure 7:
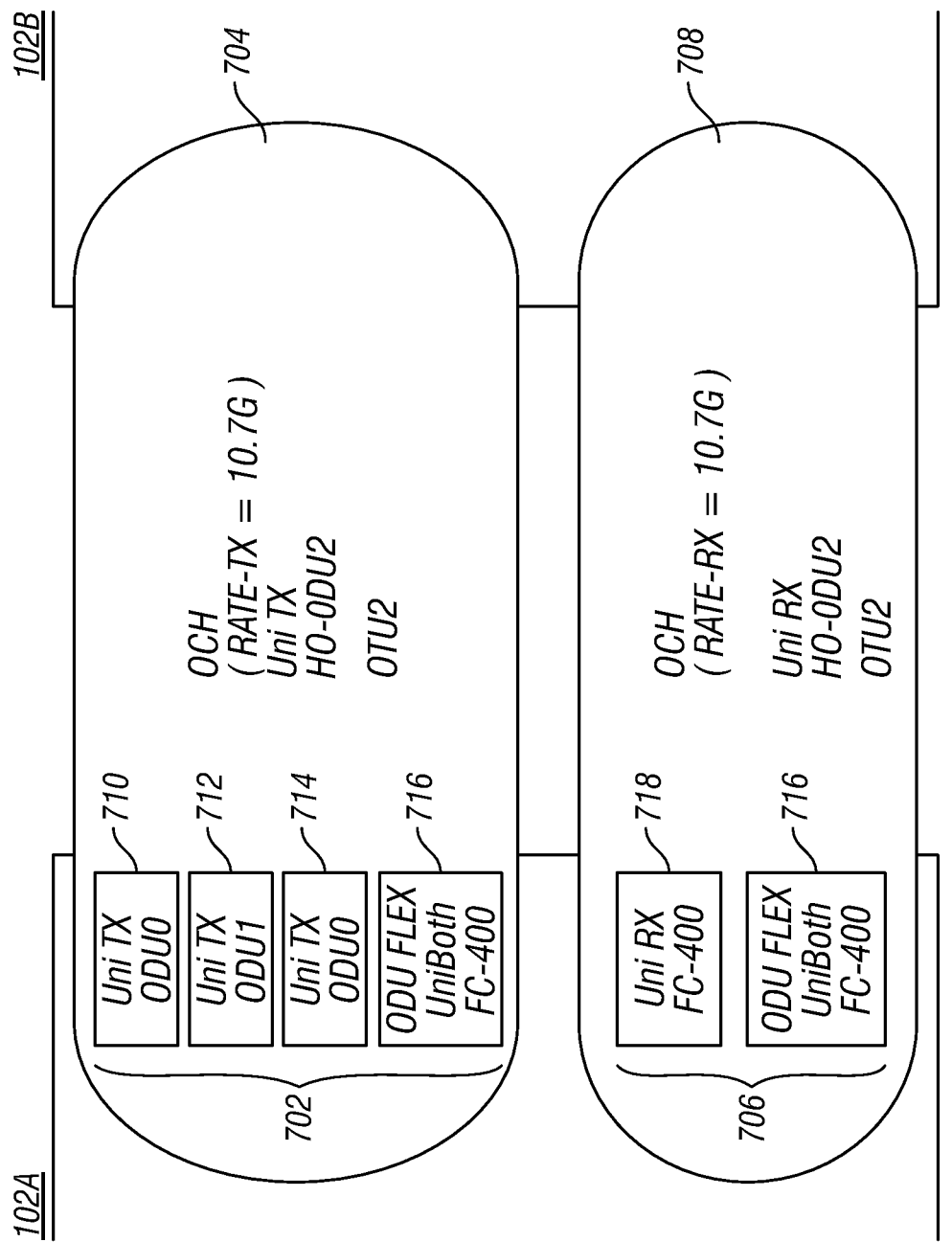
FIG. 7 illustrates a user-specified ODU sequence for egress and ingress to network element wherein the total egress rate is equal to the total ingress rate but wherein the pattern of each is unequal.

FIG. 7 illustrates a user-specified ODU sequence for egress and ingress to network element 102A wherein the total egress rate is equal to the total ingress rate but wherein the pattern of each is unequal. Such a sequence may represent, for example, Type II asymmetry. Communication may be made with network entity 102B.

Expected ingress ODUs 706 may be specified by a user of network element 102 and, in the example of FIG. 7, may include, in order, an ODUflex channel 718 (for example, of type FC-400) and another ODUflex channel 716 (for example, of type FC-400). ODUs 706 may correspond to LO-ODUs 308 of the data models illustrated in FIGS. 3A, 3B, and 3C.

The resulting total capacity of expected ingress ODUs 706 may equal (or be less than) the resulting total capacity of expected ingress HO-ODU 708. Network element 102A may be configured to determine HO-ODU 708 from expected ingress ODUs 706. HO-ODU 708 may correspond to HO-ODUi 304 of the data models illustrated in FIGS. 3A, 3B, and 3C. HO-ODU 708 may include a HO-ODU2 and have a transfer rate of 10.7 Gigabits/second.

Egress ODUs 702 may be specified by a user of network element 102 and, in the example of FIG. 7, may include, in order, an ODU0 channel 710, an ODU1 channel 712, an ODU0 channel 714, and an ODUflex channel 716. ODUflex channel 716 may be bidirectional such that it is included in both ODUs 702 and ODUs 706. ODUs 702 may correspond to LO-ODUs 306 of the data models illustrated in FIGS. 3A, 3B, and 3C.

The resulting total capacity of egress ODUs 702 may equal (or be less than) the resulting total capacity of egress HO-ODU 704. Network element 102A may be configured to determine HO-ODU 704 from egress ODUs 702. HO-ODU 704 may correspond to HO-ODUk 302 of the data models illustrated in FIGS. 3A, 3B, and 3C. HO-ODU 704 may include a HO-ODU2 and have a transfer rate of 10.7 Gigabits/second.

Figure 8:
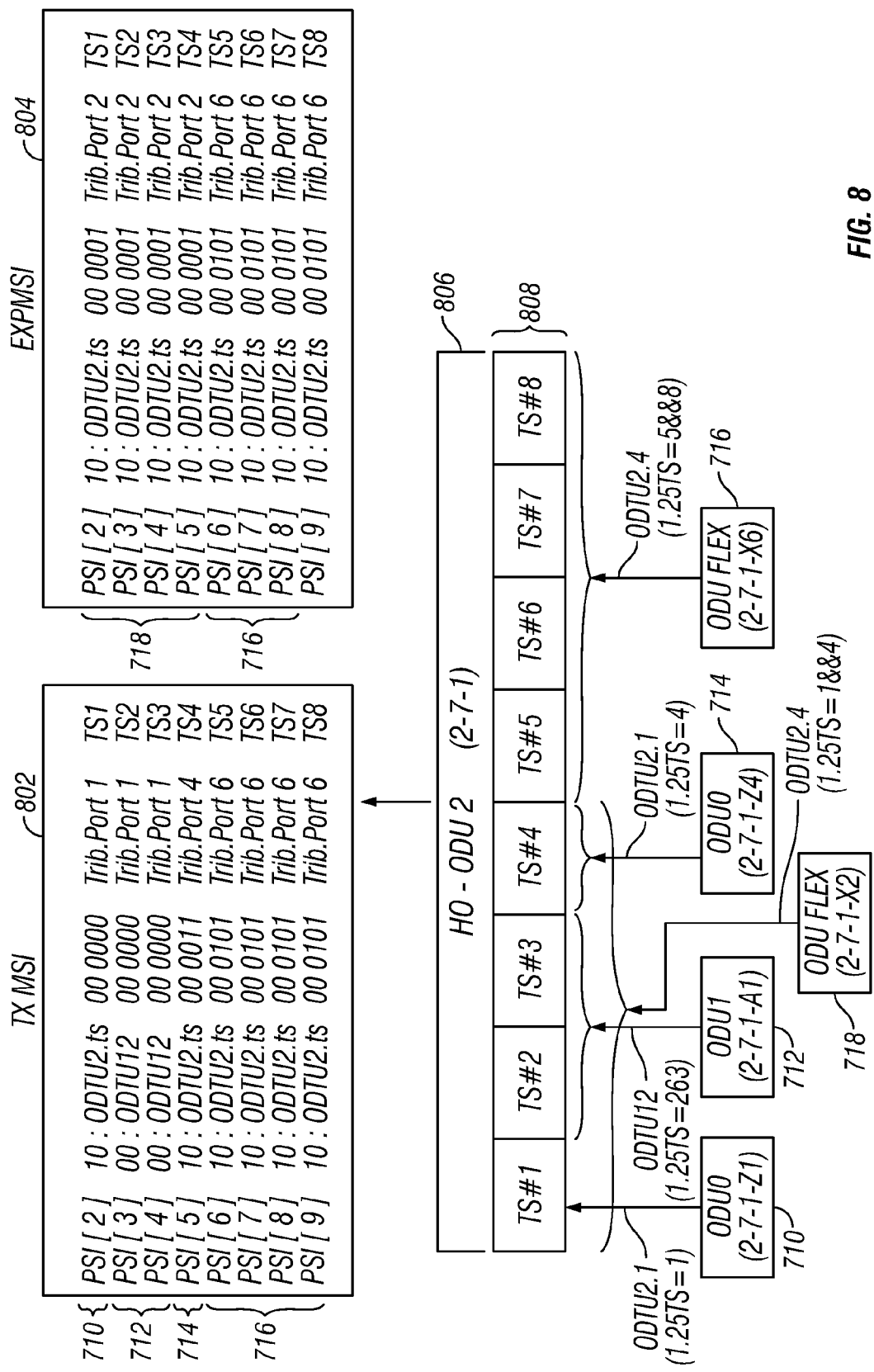
FIG. 8 illustrates a more detailed view of user-specified ODU sequence for egress and expected ingress to a network element.

FIG. 8 illustrates a more detailed view of user-specified ODU sequence for egress and expected ingress to network element 102A. The egress and expected ingress may each result in a HO-ODU2 as provisioned in FIG. 7. Network element 102 may be configured to analyze provisioning of ODUs 410, 412, 414, 416, 418 and generate a resulting TXMSI 802 for HO-ODU2 704 and EXPMSI 804 for HO-ODU2 708.

Each of ODUs 710, 712, 714, 716, 718 may be input into one or more time slots 808 as appropriate to the bandwidth of the individual ODU. Such time slots 808 may then form a resultant payload such as HO-OPU2. Network element 102 may include an OCH designated as (2-7-1). TXMSI 804 and EXPMSI 806 may be organized as described above. A given one of ODUs 710, 712, 714, 716 may correspond to a range of entries in TXMSI 802. A given one of ODUs 716, 718 may correspond to a range of entries in EXPMSI 804.

To generate EXPMSI 804 and TXMSI 802, network element 102 may first determine which data model, such as data models 301, 303, 305, is to be used. In one embodiment, given a decision to use the same ingress and egress port, network element 102 may create a single OCH with the same transmission and receiving rates but different ODU patterns, according to data model 301. Network element 102 may automatically generate commands to create the appropriate transport units and ODUs for EXPMSI 804 and TXMSI 802 to correspond to the different ingress and egress direction.

Commands to create the OCH may include, for example, "ENT-OCH::2-7-1:CTAG:::RATE-TX=10.7, RATE-RX=10.7,DIRN=UNIBOTH". The command portion "ENT-OCH::2-7-1" may specify the creation of an OCH with the designation "2-7-1". In the present example, the commands may establish that the OCH is unidirectional with transmission rate of 10.7 Gigabits per second and a receiving rate of 10.7 Gigabits per second. Creation of the OCH may spawn automatic generation of the ODUs, such as HO-ODU2 704 and HO-ODU2 708 for transmitting and receiving, respectively.

In another embodiment, given a decision to use the same ingress and egress port, network element 102 may create an OCH for the transmission and receiving, according to data model 303. Each OCH may include a facility label for the corresponding direction. Network element 102 may automatically generate commands to create the appropriate transport units and ODUs for EXPMSI 804 and TXMSI 802 to correspond to the different ingress and egress directions.

Commands to create the OCHs may include, for example, "ENT-OCH::2-7-B1:CTAG:::RATE-TX=10.7, DIRN=UNITX" as well as "ENT-OCH::2-7-C1:CTAG::: RATE-RX=10.7, DIRN=UNIRX". The command portions "ENT-OCH::2-7-B1" and "ENT-OCH::2-7-B1" may specify the creation of OCHs with facility labels according to the rates involved with each OCH. Named keywords may establish a rate of transfer according to a template of <total rate>, <directional indicators>. In the present example, the commands may establish that an OCH is created for unidirectional transmitting 10.7 Gigabits per second, and that an OCH is created for unidirectional receiving 10.7 Gigabits per second. Creation of the OCHs may spawn automatic generation of the ODUs, such as HO-ODU2 704 and HO-ODU2 708 for transmitting and receiving, respectively.

In yet another embodiment, given a decision to use different ingress and egress ports, network element 102 may create an OCH for transmission and reception, according to data model 305. Network element 102 may automatically generate commands to create the appropriate transport units and ODUs for EXPMSI 804 and TXMSI 802 to correspond to the different ingress and egress directions for the respective ports.

Commands to create the OCHs may include, for example, "ENT-OCH::2-7-1:CTAG:::RATE-TX=10.7, DIRN=UNITX" as well as "ENT-OCH::2-7-2:CTAG::: RATE-RX=10.7, DIRN=UNIRX". The command portions "ENT-OCH::2-7-1" and "ENT-OCH::2-7-2" may each specify the creation of an OCH on different ports according to the rates involved with each OCH. Named keywords may establish a rate of transfer according to a template of <total rate>, <directional indicators>. In the present example, the commands may establish that an OCH is created for unidirectional transmitting 10.7 Gigabits per second, and that an OCH is created for unidirectional receiving 10.7 Gigabits per second. Creation of the OCH may spawn automatic generation of the ODUs, such as HO-ODU2 704 and HO-ODU2 708 for transmitting and receiving, respectively.

Furthermore, commands may be auto-generated for the LO-ODUs that form the respective transmitting and receiving ODUs.

For example, commands may be auto-generated establishing ODUs 710, 712, 714. Such commands may include establishing unidirectional transmitting ODUs. For example, such commands may include:

ENT-ODU0::2-7-1-Z1:CTAG:::TS=1,DIRN=UNITX;
ENT-ODU0::2-7-1-Z4:CTAG:::TS=4,DIRN=UNITX;
ENT-ODU1::2-7-1-A1:CTAG:::TS=2&3,DIRN=UNITX;

In another example, commands may be auto-generated establishing ODU 718. Such commands may include establishing unidirectional receiving of ODUs. For example, such commands may include ENT-ODUFLEX::2-7-1-X2: CTAG:::TS=1&&4,DIRN=UNIRX.

In yet another example, commands may be auto-generating establishing ODU 716. Such commands may include establishing bidirectional receiving and transmitting. For example, such commands may include ENT-ODUFLEX::2-7-1-X6: CTAG:::TS=5&&8,DIRN=UNIBOTH.

Each such command may create an ODU of the specified type in EXPMSI 804, TXMSI 802, or both. A subsequent query of HO-ODU2 704 should yield TXMSI 802 illustrating the ODU allotments as established by the commands illustrated above. An MSI query of HO-ODU2 704 should not yield another MSI structure corresponding to, for example, actual or expected received MSI. A subsequent query of HO-ODU2 708 should yield EXPMSI 804 illustrating the ODU allotments as established by the commands illustrated above. An MSI query of HO-ODU2 708 should not yield another MSI structure corresponding to, for example, transmitted MSI.

Given a received transmission at network element 102, network element 102 may be configured to determine the MSI structure of the received transmission. Network element 102 may be configured to generate such as the MSI structure in the same manner by which an MSI structure was created for user-provisioned ODUs. Network element 102 may be configured to compare the MSI structure of the received transmission and compare with an MSI structure of a defined ingress, expected ingress, or expected received transmission. Such an MSI structure may be the result of provisioning as described above. If a discrepancy is determined, network element 102 may be configured to alert users of network element 102, adjust transmission, or take other corrective action.

Modifications, additions, or omissions may be made to network 10 and/or a network interface 106 and/or a network element 102 without departing from the scope of the invention. The components of network 10 and/or a network interface 106 and/or a network element 102 may be integrated or separated. Moreover, the operations of network 10 and/or a network interface 106 and/or a network element 102 may be performed by more, fewer, or other components. Additionally, operations of network 10 and/or a network interface 106 and/or a network element 102 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for network communications, comprising:
   determining a first access identifier (AID) for an egress signal through a network interface of a network element;
   determining a first Optical Transport Network (OTN) multiplexing structure identifier (MSI) associated with the egress signal through the network interface;
   determining a second AID associated with a defined ingress signal through the network interface;
   determining a second OTN MSI associated with the defined ingress signal through the network interface, wherein the first OTN MSI is not equal to the second OTN MSI; and
   associating the egress signal and the defined ingress signal based on the first AID, the first OTN MSI, the second AID, and the second OTN MSI.

2. The method of claim 1, wherein a total bandwidth of the first OTN MSI is equal to a total bandwidth of the second OTN MSI.

3. The method of claim 1, wherein a total bandwidth of the first OTN MSI is unequal to a total bandwidth of the second OTN MSI.

4. The method of claim 1, wherein the first OTN MSI and the second OTN MSI define communication through a same port of the network interface.

5. The method of claim 1, wherein the first OTN MSI defines communication through a first port of the network interface and the second OTN MSI defines communication through a second port of the network interface, the first port adjacent to the second port.

6. The method of claim 1, further comprising automatically generating commands establishing an optical channel specification including the egress signal and the defined ingress signal.

7. The method of claim 1, further comprising automatically generating commands establishing an optical channel specification, the commands including an egress rate defining a portion of the first OTN MSI and an ingress rate defining a portion of the second OTN MSI.

8. The method of claim 1, further comprising comparing an OTN MSI of a received signal with the second OTN MSI and, based on the comparison, determining whether a transmission error has occurred.

9. The method of claim 1, further comprising adding a facility rate label prefix to a port identification in an AID.

10. A network element comprising:
    a network interface;
    a memory;
    a first entry in the memory, including:
       an Access Identifier (AID) associated with an egress signal through the network interface; and
       an Optical Transport Network (OTN) multiplexing structure identifier (MSI) associated with the egress signal through the network interface;
    a second entry in the memory, including:
       an AID associated with a defined ingress signal through the network interface; and an OTN MSI associated with the defined ingress signal through the network interface, wherein the OTN MSI of the first entry is not equal to the OTN MSI of the second entry; and a processor communicatively coupled to the memory and configured to associate the first entry and the second entry based on the AID and the OTN MSI of the first entry and the AID and the OTN MSI of the second entry.

11. The network element of claim 10, wherein a total bandwidth of the OTN MSI of the first entry is equal to a total bandwidth of the OTN MSI of the second entry.

12. The network element of claim 10, wherein a total bandwidth of the OTN MSI of the first entry is unequal to a total bandwidth of the OTN MSI of the second entry.

13. The network element of claim 10, wherein the OTN MSI of the first entry and the OTN MSI of the second entry define communication through a same port of the network interface.

14. The network element of claim 10, wherein the OTN MSI of the first entry defines communication through a first port of the network interface and the OTN MSI of the second entry defines communication through a second port of the network interface, the first port adjacent to the second port.

15. The network element of claim 10, wherein the processor is further configured to automatically generate commands establishing an optical channel specification including the egress signal and the defined ingress signal.

16. The network element of claim 10, wherein the processor is further configured to automatically generate commands establishing an optical channel specification, the commands including an egress rate defining a portion of the OTN MSI of the first entry and an ingress rate defining a portion of the OTN MSI of the second entry.

17. The network element of claim 10, wherein the processor is further configured to compare an OTN MSI of a received signal with the OTN MSI of the second entry and, based on the comparison, determine whether a transmission error has occurred.

18. The network element of claim 10, wherein the processor is further configured to add a facility rate label prefix to a port identification in an AID.

* * * * *